April 26, 1966     L. B. TAPLIN ET AL     3,248,043
FLUID PULSE SURGE CONTROL INDICATOR
Filed June 25, 1963     7 Sheets-Sheet 1

LAEL B. TAPLIN
THOMAS E. THOMPSON
GEORGE T. BURTON
CLAYTON A. HUBEN
           INVENTORS

BY *William G. Thompson*
           ATTORNEY

PNEUMATIC TACHOMETER

PNEUMATIC TUNING FORK OSCILLATOR

PNEUMATIC TUNING FORK OSCILLATOR WITH MECHANICALLY-VARIABLE FREQUENCY

LAEL B. TAPLIN
THOMAS E. THOMPSON
GEORGE T. BURTON
CLAYTON A. HUBEN
INVENTORS

April 26, 1966  L. B. TAPLIN ET AL  3,248,043
FLUID PULSE SURGE CONTROL INDICATOR
Filed June 25, 1963  7 Sheets-Sheet 4

ERROR COMPUTER AND
DIGITAL/ANALOG CONVERTER

FUEL SUBSYSTEM

LAEL B. TAPLIN
THOMAS E. THOMPSON
GEORGE T. BURTON
CLAYTON A. HUBEN
INVENTORS

BY William G. Thompson
ATTORNEY

April 26, 1966

L. B. TAPLIN ET AL 3,248,043

FLUID PULSE SURGE CONTROL INDICATOR

Filed June 25, 1963

ANTI-SURGE SYSTEM WITH SURGE SENSOR SCHEMATIC

LAEL B. TAPLIN
THOMAS E. THOMPSON
GEORGE T. BURTON
CLAYTON A. HUBEN
INVENTORS

BY

ATTORNEY

April 26, 1966    L. B. TAPLIN ET AL    3,248,043
FLUID PULSE SURGE CONTROL INDICATOR
Filed June 25, 1963    7 Sheets-Sheet 7

LAEL B. TAPLIN
THOMAS E. THOMPSON
GEORGE T. BURTON
CLAYTON A. HUBEN
INVENTORS

BY
William S. Thompson
ATTORNEY

United States Patent Office 3,248,043
Patented Apr. 26, 1966

3,248,043
FLUID PULSE SURGE CONTROL INDICATOR
Lael B. Taplin, Thomas E. Thompson, George T. Burton, and Clayton A. Huben, Southfield, Mich., assignors to The Bendix Corporation, Southfield, Mich., a corporation of Delaware
Filed June 25, 1963, Ser. No. 290,528
4 Claims. (Cl. 230—115)

The present invention relates to a control described herein in a preferred embodiment as specifically applied to controlling fuel delivery to a gas turbine engine utilizing fluid pulse sensing and computing apparatus.

Recent advances in pure fluid amplifying valves of the stream interaction type have produced amplifying valves having many inherent advantages when applied to an engine control system and is particularly advantageous for present day high speed aircraft or nuclear applications requiring high reliability in extreme temperature environments or control systems requiring tolerance for high radiation levels. Additionally, in such applications weight considerations are of utmost importance whereas said fluid pressure interaction valves are adaptable to be packaged in small structures and as they have no or few moving parts the wear factor is eliminated thus permitting greater freedom in selecting materials on a weight or environment basis.

Accordingly it is an object of the present invention to provide a control utilizing pure fluid amplifiers of the stream interaction type.

It is another object of the present invention to adapt said pure fluid stream interaction amplifiers and principles as useful parameter sensors such as speed, surge and the like.

It is a still further object of the present invention to provide basic computing components operating on a timed-pulse or digital principle to effectively utilize said stream interaction amplifiers to compute control requirements based on sensed and input reference requirements.

Other objects and advantages of the present invention will become apparent on consideration of the description and appended drawings wherein.

Figure 1:
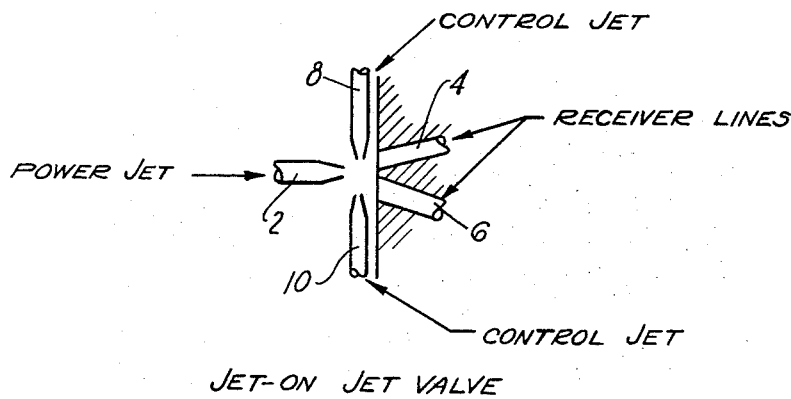
FIGURES 1 and 2 are schematic representations of prior art pure fluid amplifiers of the stream interaction type.
Figure 2:
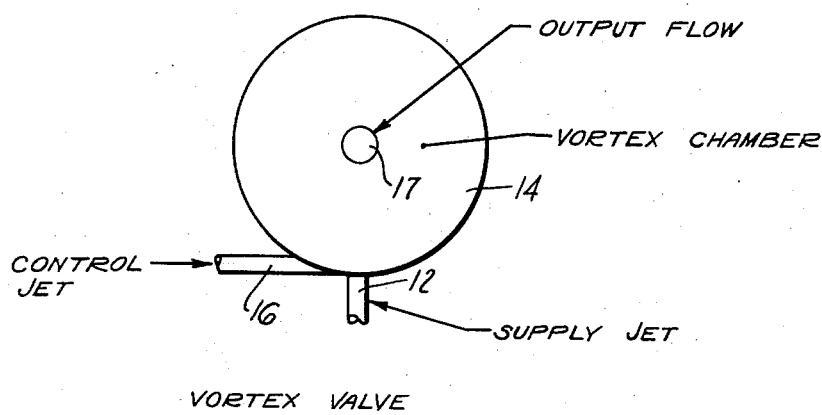

Two prior art examples of pure fluid amplifiers of the stream interaction type are illustrated schematically in FIGURES 1 and 2.

The jet-on-jet amplifier or valve is shown in FIGURE 1. This concept involves the power jet 2 supplying high pressure fluid which, when unrestrained, strikes the two receiver passages 4 and 6 symmetrically, thus building up equal pressures in each receiver line. If a control jet, such as illustrated by jets 8 or 10, is imposed on the power jet laterally, the combined momentum of the two jets causes a vector change which allows impingement of the combined jet on one hole to be somewhat larger than the other receiver hole depending on the initial momentum of the control jet. The pressure level of the control jet is considerably below that of the power jet and this jet-on-jet amplifier has been demonstrated to have power gains ranging from 10:1 to 100:1. Differential pressure gains, that is the differential pressure between receiver passages 4 and 6 ratio to the differential pressures between a pair of control jets 8 and 10 can be as high as 50:1.

Another type of all fluid valve or amplifier is the vortex valve as shown in FIGURE 2. Here a supply jet 12 is brought into a cylindrical cavity defined by the wall 14 radially. A control jet 16 is located at right angles to the supply jet and tangential to the wall 14. The control jet need not necessarily be introduced in the same vicinity as the supply jet, but may be tangentially located around the wall 14 in many places. The exit flow is taken out through a hole 17 located in the center of the device. If the control jet alone is turned on, it is seen that a vortex sheet will be established within the cylindrical chamber. Introducing the supply jet alone will cause a radial flow across the cavity to the exit hole 16. With the supply jet flow established, if the control jet flow is increased, a vortex build-up occurs causing a centrifugal pressure to exist at the supply jet port so that increasing the control jet flow causes the actual supply flow to be decreased. The power gain for this device has been established at around 10:1 for gases and approximately 20:1 for liquids. That is, the flow work required at the control jet to appreciably cut down the flow work at the supply jet is approximately 10% of the initial flow work entering the supply jet. The incremental gain associated with the device, that is, the change in supply flow for a small change in control jet flow has been reported as high as 100,000:1.

A considerable amount of work is going on in basic valves of the types described above and similar varieties which are generically referred to herein as "stream interaction fluid amplifiers." The species shown in FIGURE 1 is referred to herein as "jet-on-jet" amplifier whereas the FIGURE 2 species is referred to as a "vortex" amplifier.

*Engine control parameters*

The present invention as disclosed herein is applied to a gas turbine engine, particularly to fuel delivery thereto, however, as will be apparent some of the basic computing and sensing subcomponents will have a broader application and for these subsystems the present description should be considered as illustrative and not restrictive.

The primary quantity involved in the control of a gas turbine engine is engine speed or speed of the turbine and/or compressor assembly. The desired level of engine speed is selected by the pilot and is introduced into the engine control system via a throttle normally located in the cockpit.

Figure 3:
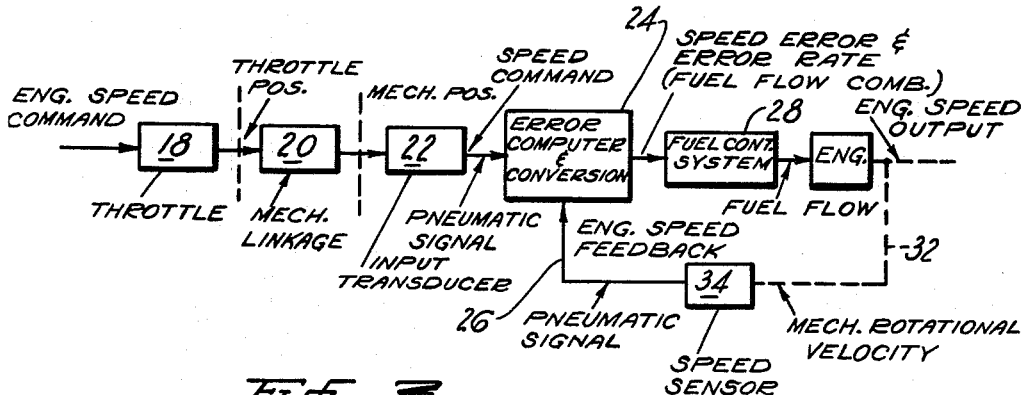
FIGURE 3 is a functional block diagram of a basic engine speed control loop.

Referring to FIGURE 3, there is shown a functional block diagram of a basic engine speed control loop wherein a pilot control throttle is represented by the block 18. Throttle position is transmitted via mechanical linkage represented by block 20 to an input transducer 22 which is a control device for converting the throttle position signal to a pneumatic pulse signal. The pneumatic signal from transducer 22 is applied to the error computer section 24 for comparison with speed pulse feedback signal supplied by connection 26 to produce an error signal. Error computer 24 additionally converts the digital pulse logic to a continuous analog signal suitable for positioning physical apparatus and thus is also designated as a digital/analog converter. The output of computer 24 is supplied to the fuel control subsystem 28 (fuel valve) to control the rate of fuel delivery to the engine 30 and thus affect engine speed. Actual engine speed output is supplied by a mechanical rotation through connection 32 to speed sensor 34 where it is converted to a pneumatic pulse signal to comprise the feedback quantity 26 and which is adaptable for comparison with the output of transducer 22. This system comprises a basic speed control loop which provides accurate control of engine speed and is functionally adapted to utilize the pulse information to control the fuel control subsystem. In operation, the pilot requests his speed by positioning throttle 18. If the requested speed differs from the actual speed supplied by feedback connection 26 an error signal is generated in computer 24 which is supplied to the fuel subsystem 28 for changing fuel flow and thus speed in a direction to correspond with that requested.

Whereas speed is the primary controlled quantity of interest in a gas turbine engine control, practical behavior of jet engines requires consideration of engine compressor surging. Surging results in reduced compressor efficiency and in potential vibration damage to the compressor structure and must be avoided. Surging is influenced by fuel flow and can be avoided by appropriate limitations placed on fuel delivery in response to sensed surge conditions.

Figure 4:
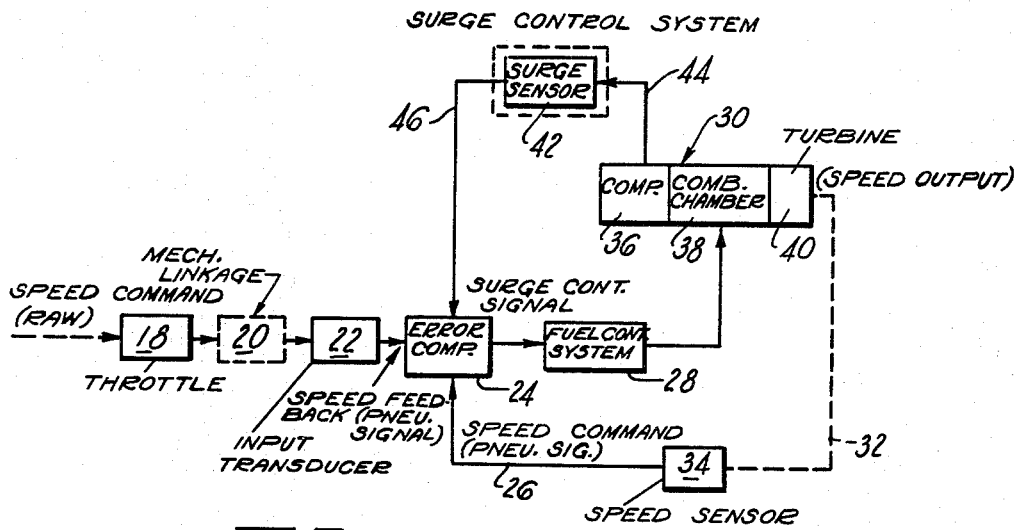
FIGURE 4 is a functional block diagram of an engine control system including the speed control loop of FIGURE 3 with additional surge limiting functions.

FIGURE 4 shows a functional block diagram of an engine control system including the basic speed control loop of FIGURE 3, wherein corresponding blocks bear the same numerals and the engine 30 is broken down into its main subcomponents of a compressor section 36, a combustion chamber 38, and a turbine 40. A surge control system is added in FIGURE 4. A surge sensor represented by block 42 is provided and connected to the compressor 36 by connection 44 for sensing an impending surge condition. If surge is imminent, surge sensor 42 which is connected at 46 to the computer section 24 is operative to override the speed control and avoid surge by reducing the error signal within computer 24 and thus reducing fuel. Surge prevention functionally serves to override the speed control loop during periods when dangerous surge conditions exist. Considering the auxiliary nature of the surge system, the speed and surge control systems can be discussed separately. Since the speed control system is primary, it is discussed first.

*Speed control loop*

The basic speed control loop functionally shown in FIGURE 3, consists of four basic subcomponents shown in FIGURES 5 through 9. Considering that one prime object of this invention is to utilize stream interaction type fluid amplifiers, a digital approach employing frequency-modulated fluid pulse trains is employed for the following major reasons:

(1) Analog signals are categorically less suitable for signal transmission where non-linearities, distortion, and noise levels are significant.

(2) Though generally having appreciable non-linearity, most known stream interaction amplifiers have fast switching response time which make them ideal for digital applications when linearity is of decreased importance. In this application where speed, and surge are the primary sensed conditions, digital sensors of extreme accuracy have been achieved with very simple and reliable designs.

(3) In general, with a digital approach, reference speed and surge signals can be generated as frequency signals which are strongly resistant to distortion or masking by noise.

Figure 5:
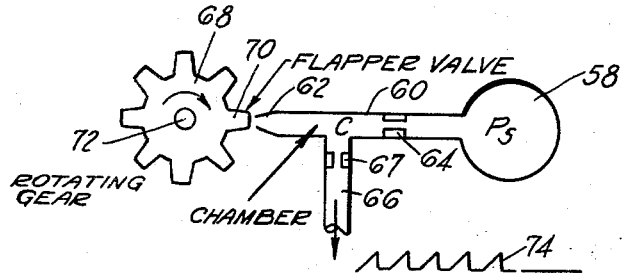
FIGURE 5 is a schematic drawing of a pneumatic tachometer or speed sensor.

Referring to FIGURE 5, there is shown a pneumatic tachometer or speed sensor which functions to convert a mechanical rotational velocity into a pneumatic pulse signal wherein the pulse frequency varies with speed to accomplish the function indicated by block 34 of FIGURE 3.

The pneumatic tachometer comprises a supply chamber 58 containing a high pressure source, $P_s$, a connecting transmission line 60 terminating with a jet nozzle 62 and containing a restrictive orifice or bleed member 64 upstream and in series with nozzle 62 to define a chamber C therebetween. An output line 66 having a bleed 67 is connected to lines 60 at chamber C. A rotatable gear 68 has a series of spaced teeth or flapper valves 70 which rotate in a close proximity to nozzle 62. In this device, the gear 68 is connected by shaft 72 to the engine to rotate in proportion to turbine speed. As a tooth 70 goes by nozzle 62 and restricts the flow, a positive pressure pulse is developed within the chamber C and is transmitted through restriction 67 as an output through line 66. The pulse frequency is $f = n \times w$ (pulses/sec.) where "$n$" is the number of teeth and "$w$" is the rotation speed of gear 68 in revolutions per second. This pneumatic tachometer converts rotational velocity to a pneumatic pulse rate or frequency to provide an output pressure pulse train as characterized by reference numeral 74 wherein the time duration between adjacent pulses is proportional to engine speed.

As functionally shown in FIGURE 3, blocks 18, 20 and 22 collectively produce a pneumatic pulse output representing a desired engine speed value selected by the pilot or operator. This is accomplished in the present invention by providing a fixed reference or known frequency pulse oscillator or generator with an operator adjustable means for varying the reference frequency with speed demand.

Figure 6:
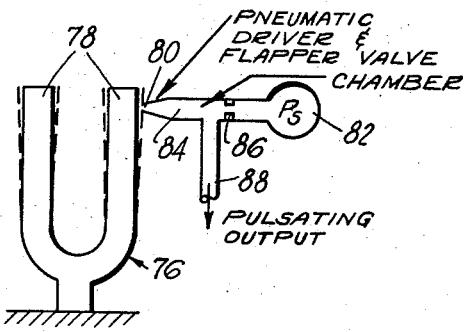
FIGURE 6 is a schematic drawing of a pneumatic tuning fork oscillator or fixed frequency pulse generator.

Referring to FIGURE 6, there is shown a pneumatic tuning fork oscillator or pulse generator for producing a known and fixed frequency pneumatic pulse train. The tuning fork oscillator comprises a tuning fork 76 as the frequency determining element having a pair of tines 78, one of which is arranged in close proximity to a nozzle 80. As with the speed sensor, a high pressure, $P_s$, contained in supply chamber 82 is connected by transmission line 84, having bleed 86, to nozzle 80; and an output line 88 is connected to line 84 intermediate to bleed 86 and nozzle 80. Tine 78 vibrates at its natural frequency alternately opening and closing nozzle 80 causing pressure pulses in output line 88 at its natural frequency or a known reference value. This oscillator is self-exciting when air pressure is supplied by nozzle 80 and requires no additional initiation or excitation means.

Figure 7:
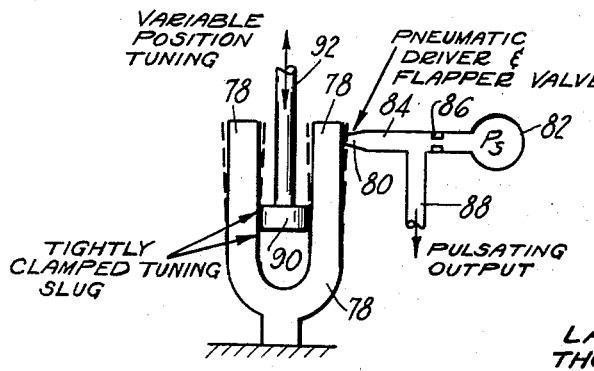
FIGURE 7 is a schematic drawing of a pneumatic tuning fork oscillator with mechanically variable frequency pulse output.

In FIGURE 7 there is shown a similar pneumatic tuning fork oscillator or pulse generator except that means have been provided to vary the reference frequency value in response to a mechanical position as may be applied by a throttle. The basic tuning fork oscillator may be the same as that shown in FIGURE 6 and bears the identical numerals with the addition of a movable wedge or tuning slug 90 clamped between tines 78 and having a positioning rod or connection 92 for adjusting the tuning slug longitudinally of the vibrating tines and varying the effective length thereof. Movement of slug 92 to vary the effective length of tines 78 alters the vibrating frequency. For example, commercially available tuning forks so adapted have been found to produce satisfactory frequency variations of the order of 3:1 which is an acceptable range of variation for a pilot's command signal.

The error computer and converter represented by block 24 of FIGURE 3 performs two basic functions which are as follows:

(1) Comparing actual speed pulse signals produced by sensor 34 with requested speed pulse signals from throttle 18, linkage 20 and transducer 22 to develop a speed error signal proportional to the difference between actual and requested speed.

(2) Converts digital pulses to a continuous analog signal adaptable to positioning a fuel valve or other physically movable output member.

Figure 8:
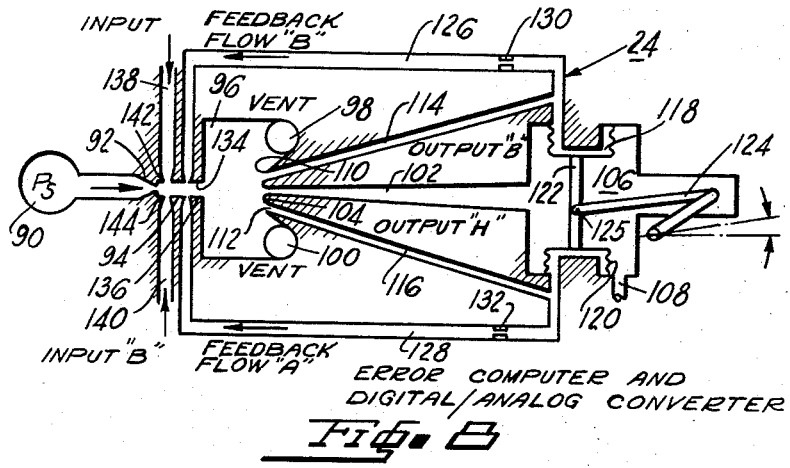
FIGURE 8 is a schematic drawing of an error signal computer and digital to analog signal conversion devices.

The error computer and converter is shown in greater detail in FIGURE 8. This circuit consists of a high pressure supply chamber 90, $P_s$, supplying pneumatic pressure to main supply jet 92. Immediately downstream of supply jet 92 is a deflection chamber 94 which in turn is connected to receiving chamber 96. Near the opposite or right side wall of receiver chamber 96, as viewed in FIGURE 8, are arranged vent passages 98 and 100 connected to a low pressure region such as the atmosphere so that the general pressure level in receiving chamber 96 is low. A primary vent passage 102 has an opening 104 in the right side wall of chamber 96 in alignment with supply nozzle 92 so as to normally receive the high pressure stream being ejected by the supply nozzle. The main supply stream passes through primary vent passage 102 through bellows chamber 106 and out vent passage 108 to the atmosphere. Spaced symmetrically on opposite sides of vent opening 104 are a pair of output openings 110 and 112 which are connected to output passages 114 and 116 respectively. Output passage 114 communicates with the interior of a first bellows or pressure responsive member 118 contained in bellows chamber 106 and secured to its upper end wall. Output passage 116 is similarly connected to a second bellows 120 secured to the lower end wall of chamber 106 and aligned with bellows 118. The free ends of bellows 118 and 120 are connected by a rod 122 so that rod position is a function of the difference in pressures acting on the opposed bellows. An angularly movable output linkage 124 is pinned to rod 122 at 125 for movement therewith. Output passages 114 and 116 are additionally connected to feedback passages 126 and 128 respectively, each containing a bleed 130 and 132 and terminating at nozzles 134 and 136 exhausting into deflection chamber 94 on opposed sides thereof and generally transverse to the main supply stream flow from nozzle 92.

Two control passages 138 and 140 terminate with control jets 142 and 144 respectively into deflection chamber 94 generally transverse to the stream flow from main supply jet 92 on opposed sides thereof.

With no control signal supplied by either control passage 138 or 140, a continuous stream of high pressure air will be ejected by supply nozzle 92 traversing deflection chamber 94 and receiver chamber 96 where it will impinge on primary vent opening 104 and be transmitted through passage 102, chamber 106 and vent 108 to the atmosphere. This flow will have no positioning effect on rod 122. To the extent it causes a pressure increase in bellows chamber 106 this pressure acts equally on opposed bellows 118 and 120 and is balanced out. To the extent scattered portions of the main supply stream do not enter primary vent opening 104, they will be either exhausted through vents 98 and 100 or impinge substantially uniformly on symmetrically spaced outlet ports 110 and 112 causing equal and offsetting pressure increases in bellows 118 and 120.

If a pressure pulse train control signal is supplied to control passage 138, designated input A, it will be directed by control jet 142 transversely against the main supply stream and deflect the main stream downwardly in the direction of outlet signal port 112 to produce an amplified pulse output in line 116 and bellows 120. At the conclusion of each control input pulse in passage 138, the main supply stream will snap back to its original alignment with primary vent 104. Consequently, the pulse period of the output signal A corresponds with the pulse period of input signal A. A second control pulse, input B, is applied to control passage 140 where it is similarly operative to deflect the main stream into outlet passage 114. When the pulse frequency of inputs A and B are equal, the main supply stream will be deflected an equal number of times per time unit towards outlet passages 114 and 116 causing an equal and offsetting build-up in pressure within bellows 118 and 120. If, however, there is a disparity in pulse frequency between inputs A and B a pressure unbalance is created to position rod 122 and linkage 124. For example, should the pulse repetition frequency of input A be 400 c.p.s., while that of input B is 350 c.p.s., for each second, bellows 120 will receive an average of fifty additional pulses over bellows 118. Bellows 118 and 120 have a relatively large volume and act as accumulators or integrators wherein the pressure level in each is a function of the pulse frequency received. Thus in the assumed example, the pressure level in bellows 120 will be greater than that in bellows 118 thus positioning rod 122 upwardly and angularly positioning output linkage 124 clockwise. If the pulse frequency of input B were greater than input A, the pressure in bellows 118 would be the greatest, positioning rod 122 downwardly. Since bellows have their own inherent resistance to deformation the degree rod 122 is positioned, is dependent on the magnitude of pressure difference within the bellows which in turn is dependent on the difference in pulse frequency between inputs. Of course, were the bellow's deformation resistance is insufficient or diaphragms are used, springs may be used to establish proportionality.

Thus the pressure difference between bellows 118 and 120 to move rod 122 is proportional to the difference in frequencies or error between inputs A and B. Moreover the device has converted the digital pulse type information to a continuous analog type signal positioning linkage 124.

Feedback means 126 and 128 have been provided in order that a degree of gain control may be obtained. For example, as a pulse input A is applied it diverts the main supply stream to passage 116 whereby a certain portion of the output pulse, depending on the size of bleed 132, will be directed through feedback flow path 128 out nozzle 136 into deflection chamber 94 in opposition to the input flow from nozzle 142. The feedback flow thus subtracts or opposes the control flow and by varying the size of bleed 132, by replacement, the relative quantities may be established to provide a desired gain. The feedback flow in passage 126 operates in a similar manner in opposition to input B.

When feedback passages 126 and 128 have appreciable volume (which may be intentionally added) pressurization of passages 126 and 128 can be delayed with consequent delay in pressurization of nozzles 134 and 136 respectively. In this feedback configuration, this delayed pressurization results in a frequency variant gain control which provides an output differential pressure across bellows 118 and 120 which is not only proportional to differential input (A−B) but also proportional to the time rate of change of the differential input (A−B).

Figure 9:
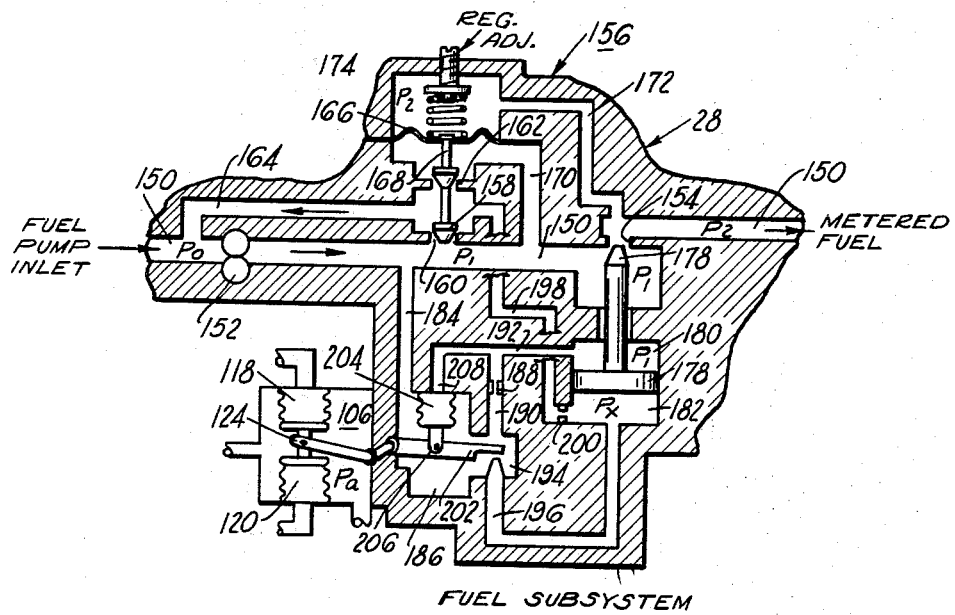
FIGURE 9 is a schematic drawing of a fuel control subsystem for controlling engine fuel delivery in response to a pneumatic signal.

In FIGURE 9 there is shown a fuel controlling subsystem 28 for utilizing the angular displacement of linkage 124 of the error computer as an input signal and metering a rate of fuel delivery in response to this input.

Fuel from a source, not shown, is supplied to a main fuel passage 150. Low pressure supply fuel is designated $P_0$. In the upstream portion of main fuel passage 150 there is disposed a high pressure gear pump 152 for pressurizing fuel to a relatively high value designated $P_1$. Fuel from pump 152 flows rightwardly through passage 150 through orifice or valve seat 154 where it is metered and continues out passage 150 as metered fuel where it is adapted to be supplied to the manifold or fuel delivery nozzles of an engine. Metering orifice or valve seat 154 produces a pressure drop or loss so that metered fuel is at a lesser value than $P_1$ and is designated $P_2$. The pressure drop or head $P_1-P_2$ is the metering head.

Metering head $P_1-P_2$ is maintained at a constant value by a by-pass valve generally indicated at 156. By-pass valve 156 includes a double ported pressure balanced valve 156 controlling $P_1$ pressure fuel through valve seats 160 and 162 to by-pass conduit 164 which returns fuel to the inlet or low pressure side of pump 152. Valve 156 is controlled by diaphragm 166 peripherally secured to the control housing and secured at its center to rod 168 on which the double valve portions are mounted. $P_1$ pressure fuel is supplied to the lower side of diaphragm 166 by conduit 170 whereas $P_2$ pressure fuel is supplied to the upper side by conduit 172 so that metering head $P_1-P_2$ acts on diaphragm 166. An adjustable head spring 174 provides a relatively constant downwardly or valve closing force on diaphragm 166.

The force balance on diaphragm 166 established by spring 174 acting in a valve closing direction and the metering head $P_1-P_2$ acting in a valve opening direction maintains the head across valve seat 154 at a substantially constant value. Should $P_1-P_2$ tend to increase, the by-pass valve is moved in an opening direction, by passing more fuel through conduit 164. This decreases the fuel flow in conduit 150 downstream of the by-pass valve reducing $P_1-P_2$ to its selected value. Should $P_1-P_2$ decrease, the reverse action occurs whereby more fuel flows through conduit 150 and valve seat 154 raising $P_1-P_2$ in a corrective direction.

Metering valve 176 is operative with the valve seat 154 to control the effective area of fuel metering orifice. A hydraulic servo piston 178 is secured to the end of the metering valve and is slidable in a bore in the control housing to define a first control fluid chamber 180 and a second control fluid chamber 182 on opposed piston sides. $P_1$ pressure fluid from main conduit 150 is transmitted via passage 184, servo valve chamber 186, rate bleed 188 in branch passage 190, and passage 192 to first control fluid chamber 180 where it acts on one side of piston 178 having the smaller effective area, tending to move valve 176 in a direction to increase effective area and thus rate of fuel delivery. Pressure in chamber 180 is designated $P_1'$ to distinguish from $P_1$ fluid upstream of rate bleed 188. A controllable pressure servo fluid ($P_x$) is supplied to second control fluid chamber 182, from $P_1$ fluid source in servo valve chamber 186, through servo orifice 194 and passage 196. Chamber 182 is also connected to a low pressure reservoir $P_0$, through passage 198 having servo bleed 200. $P_x$ fuel in chamber 182 acts upwardly on piston 178 over the larger surface of piston 178 and in opposition to $P_1'$ fluid in chamber 180. $P_x$ pressure is controlled by establishing a controlled pressure drop through servo orifice 194 by means of the pivot input lever 202 which is secured to the output linkage 124 of the error computer mechanism of FIGURE 8, a portion of which is re-illustrated in FIGURE 9. The end of input lever 202 is arranged in close proximity to servo orifice 194 whereby the $P_1-P_x$ pressure drop is controlled by angular movement of lever 202 which thus acts as a servo control valve. A rate feedback force is supplied to lever 202 by means of bellows 204 in chamber 186 which has its movable end pinned at 206 to lever 202. Bellows 204 is fixed at its other end to the control housing and communicates through passage 208 with passage 192 downstream of rate bleed 188.

The servo system for positioning metering valve 176 may be termed an integrating system inasmuch as piston 178 will move a distance proportional to the integral with respect to time of the deviation of input lever 202 from its neutral or null position. Operation of the fuel subsystem is as follows:

At a stable or no-movement condition of piston 178 the fluid pressure forces acting on piston 178 are in balance with $P_x$ having a pressure value a certain fixed percentage less than $P_1'$ corresponding closely with the area ratio on opposed piston sides. Expressed mathematically, and neglecting fluid pressure end loading on valve 176:

$$P_1'A180 = P_x A182$$

where A 180 equals the area of piston 178 communicating with $P_1'$ pressure in chamber 180 and A 182 is piston area exposed to $P_x$ fluid in chamber 182.

Re-expressing the above equation:

$$P_x/P_1' = A_{180}/A_{182} = K$$

where K is a constant of less than one representing the area ratio.

There is one position of input lever 202 termed its null position which will establish the balancing $P_x/P_1'$ pressure ratio by controlling the $P_1-P_x$ pressure drop through serve orifice 194. If lever 202 deviates from this null position as for example in a direction closer to servo orifice 194, the $P_1-P_x$ pressure drop is increased thus lowering the value of $P_x$ pressure. This causes a force unbalance across piston 178 causing it to move downwardly. Deviation away from null position by lever 202 causes $P_x$ to increase moving piston 178 upwardly.

The rate at which piston 178 moves is controlled by the rate fluid can transfer into or out of chamber 180 through rate bleed 188. When piston 178 is not moving there is no fluid flow through bleed 188 and $P_1'$ equals $P_1$. In this condition rate feedback bellows 204 is ineffective as equal fluid pressure acts both exteriorly and interiorly of the bellows. As piston 178 moves it causes fluid to flow through rate bleed 188 establishing a $P_1'-P_1$ (or $P_1-P_1'$) pressure drop proportional to the rate of piston movement. The pressure drop across bleed 188 is also applied to bellows 204 to produce a feedback force on input lever 202 opposing its movement from null, proportional to piston velocity.

By means of the rate feedback force applied to input lever 202 in opposition to its movement, the degree of deviation of lever 202 from its null position is caused to be proportional to piston velocity. This is a characteristic of an integrating servo mechanism since if the rate of movement or velocity of piston 178 is proportional to lever deviation then the total piston displacement becomes the integral of lever deviation taken with respect to time since velocity is a time related quantity.

Figure 15:
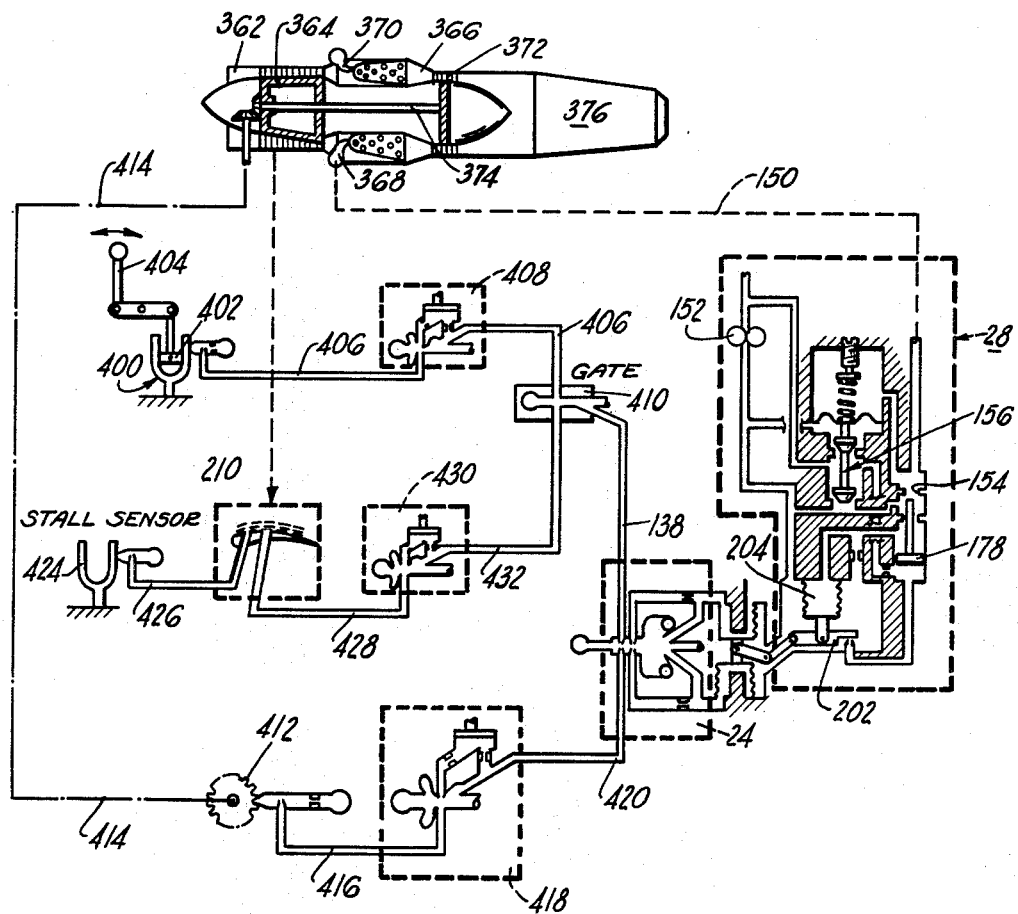
FIGURE 15 is a drawing of an engine fuel system incorporating the teachings of the present invention.

To summarize briefly the operation of the speed loop and combining the devices of FIGURES 5, 7, 8 and 9, a variable pulse frequency reference indicating desired engine speed is generated by the pneumatic tuning fork oscillator of FIGURE 7. The pulse output line 88 may be connected to input line 138 of the error computer of FIGURE 8 to comprise input A. The pulse frequency output from line 66 of the pneumatic tachometer of FIGURE 5 may be connected to line 140 of the error computer to comprise input B. The error computer positions linkage 124 proportionately to the pulse frequency error between the desired speed reference of input A and actual speed reference of input B. Linkage 124 is directly connected to the input lever 202 of the fuel subsystem of FIGURE 9 to cause correcting movement of fuel valve 176 at a rate proportional to speed error. As valve 176 changes fuel delivery to the engine, actual speed will change in a corrective direction in response to a fuel change and thereby alter the speed rotating gear 68 of the pneumatic tachometer of FIGURE 5 in a direction to bring the actual speed reference of input B in balance with the requested speed reference of input A. This integrated system is shown in FIGURE 15 which will be discussed at a later point.

Surge system

The condition known as surging in a gas turbine engine having a compressor is related to compressor speed, inlet air velocity, temperature and other variables and parameters. Given enough information on engine conditions, surging may be predicted by computation, and appropriate preventive action can be undertaken. Surge prediction by computation requires several input sensors to gather the required input information, and a computing system to process the information. The fact that the computation cannot be programmed with perfect accuracy requires that an appreciable safety margin must be applied such that anti-surge action (fuel flow reduction) must be made to take effect safely before the actual surge conditions arise. However, when an impending surge is sensed directly as against being computed, the complexity of a computer and numerous sensors can be eliminated and a more efficient avoidance of surge is possible. Accordingly, the surge system of the present invention utilizes the principle of direct sensing of impending surge and utilizes all pneumatic components to provide an extremely accurate surge control with a minimum of structural complexity.

Surge sensing

Figure 10:
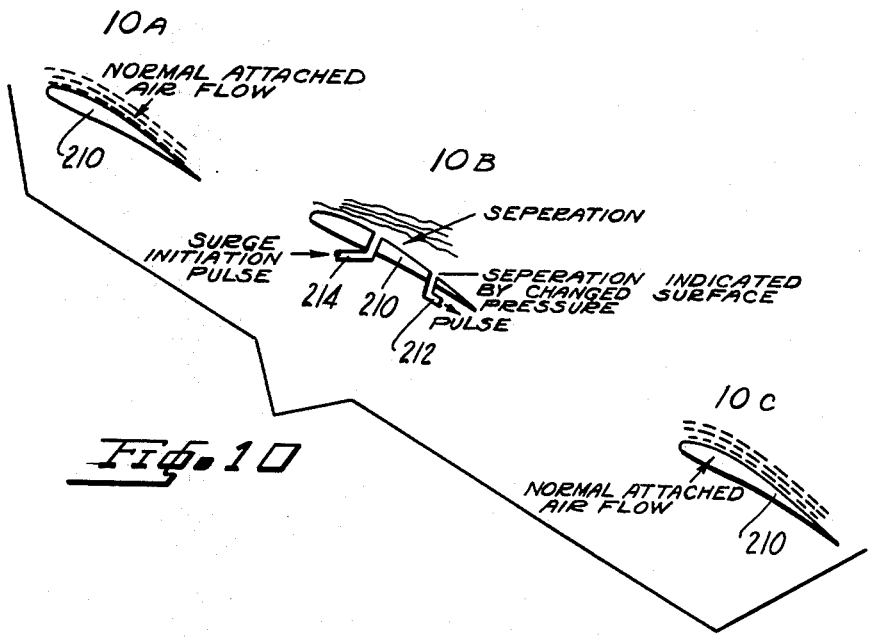
FIGURE 10 illustrates air flow pattern over an engine compressor blade and impending stall detection.

The onset of surging results in a separation of air flow from the trailing edge of the upper or low pressure side of a compressor stator blade indicated by numeral 210 in FIGURES 10A, 10B and 10C. The separation experienced is not unlike that experienced above the wing of a stalled aircraft, and the words "stall" and "surge" are frequently used interchangeably. Refer to FIGURE 10A wherein dotted lines indicate normal air flow over the convex or low pressure surface of a compressor stator blade having an airfoil shape with an upper convex and a lower concave surface; whereas FIGURE 10B wavy lines over the blade convex surface indicate air flow during surge and indicate that the air flow separates from the blade surface. Since the separation results in a decrease in lift on the upper trailing edge of the blade, pressure in this region is increased. A pressure sensor, indicated by passage 212 in FIGURE 10B, is located at the blade convex surface in the region of separation near the trailing edge and would sense the separation as a step of increased pressure. Such a pressure signal is adapted for use to indicate surging and initiate appropriate anti-surge control functions.

Unfortunately, surging results in reduced engine efficiency and potential accelerated wear and damage to the engine. For practical reasons it is undesirable to allow an actual surge condition to develop. A method of predicting surge pre-conditions is required. It has been found that separation is imminent in the surge pre-condition state. Therefore, by inducing a transient surge separation on a properly selected blade the proximity to surge may be sensed without actually encountering surge. In the present invention separation is induced when surge is imminent by applying a short pneumatic pulse through passage 214 which is located toward the leading edge of blade 210 in comparison to pressure sensing passage 212 and in flow alignment along a chordal blade section. By supplying a short pulse through passage 214 a short transient separation of air flow will occur if surge is imminent. This short separation will cause an increase of pressure in the trailing edge region where it will be sensed by passage 212. When surge is not imminent the initiation pulse supplied by passage 214 will not induce separation.

Figure 11:
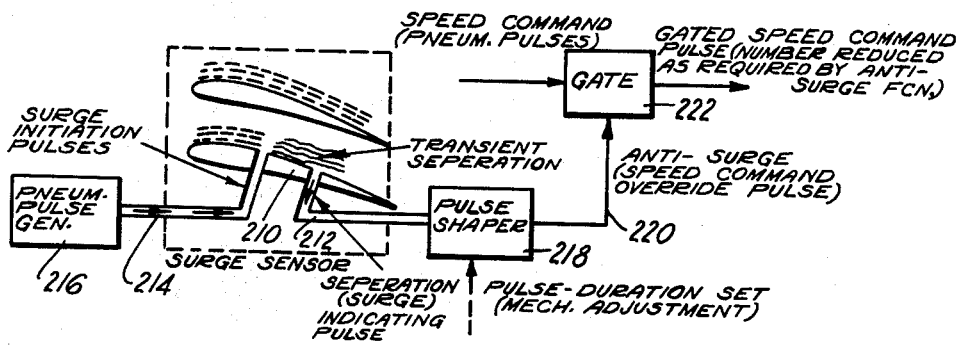
FIGURE 11 is a functional block diagram of surge subsystem.
Figure 14:
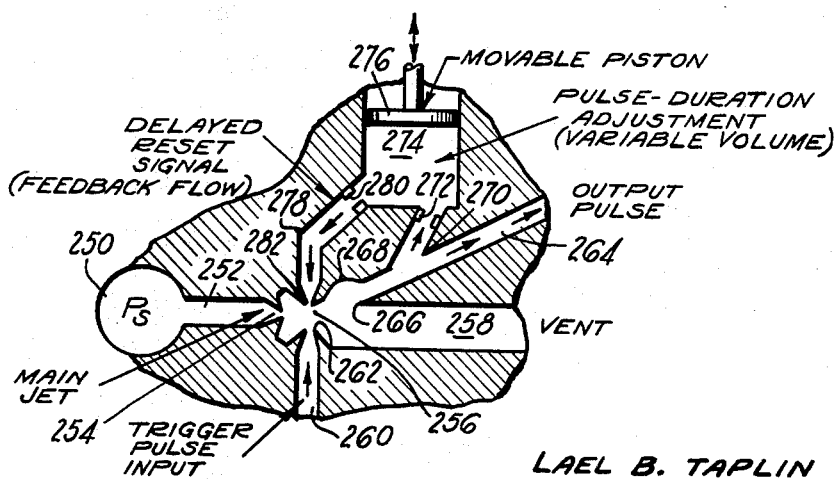
FIGURE 14 is a schematic drawing of a pulse shaper device.

Referring to FIGURE 11 there is shown a block diagram of the surge subsystem and includes a pneumatic pulse generator 216 for supplying an initiation pulse of known frequency, see FIGURE 6 for fixed frequency oscillator. Pulses generated in pneumatic pulse generator 216 are transmitted by passage 214 to a selected compressor stator blade 210. The magnitude of the pulses is made such that separation can be induced only when surge is imminent. When a transient separation occurs indicating surge preconditions, the increased pressure developed downstream is sensed by passage 212 and transmitted to a pulse shaper 218 (FIGURE 14). Pulse shaper 218, as will be more fully described at a later point, is triggered by the sensed pulses in passage 212 to produce output pulses in line 220 of uniform amplitude and duration but of the same frequency of the sensed pulses in passage 212. Pulses developed in shaper 218 are transmitted to the gate device 222, also to be later described, to close a gate in the speed-command-pulse path (for example in path of input A of FIGURE 8) lowering the engine speed and avoiding stall or surge.

Since in the speed control loop, fuel flow is proportional to the pulse frequency of speed command, fuel flow can be reduced by gating a number of pulses of input A derived from speed command oscillator (FIGURE 7). The amount of fuel flow reduction for each surge indication signal is related to the number of pulses gated and thus to the time duration of the gate pulse. The longer the gate pulse, the more fuel flow and engine speed is reduced for a given pre-surge separation indication. The gate-pulse time duration therefore directly influences the gain of the surge control function. In addition, since the rate of command pulses being gated is proportional to speed command, the speed reduction per surge gate pulse is essentially a percentage of command engine speed. For a given surge gate pulse duration, the amount of speed reduction for a given surge indication pulse will be greater at high speed command levels than at low.

The components of the surge system consist of the pulse generator 216 and surge sensor previously described and gate valve 222 and pulse shaper 218 described as follows.

Gate

The basic surge limiting function operates by sensing an impending surge condition and reducing engine speed to avoid the impending surge.

Since speed command pulses always exist during normal engine running, a method of reducing engine speed is to reduce the number of speed command pulses by gating. A closed gate in a pulse transmission line inhibits the flow of pulses beyond the gate, essentially reducing the speed command signal while the gate is closed. In the surge limiting system of the present invention, a pneumatic pulse of specified time duration is generated when a surge separation is initiated.

Figure 12:
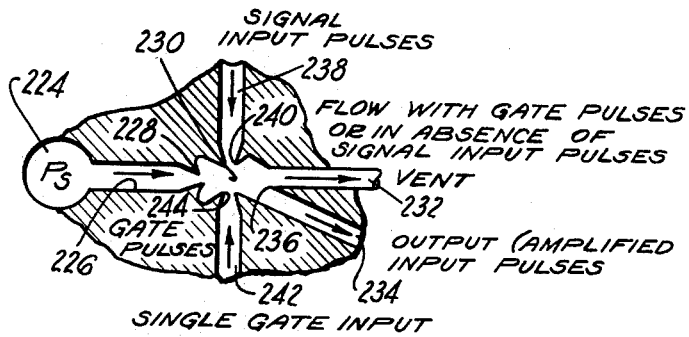
FIGURE 12 is a schematic drawing of a gate valve for selectively blocking a pulse signal in response to a single blocking input.

An all pneumatic gate valve of the single input type is shown in FIGURE 12. The gate consists of a high pressure supply chamber 224 supplying a main supply stream of pneumatic fluid via passage 226 to supply jet 228. Supply jet 228 ejects the main supply stream into receiving chamber 230 which it traverses and flows out aligned vent passage 232 to the atmosphere or the like. An output passage 234 is arranged obliquely with respect to vent passage 232 and contains an output receiving port 236 opening into receiving chamber 230 and spaced offset from the main supply stream traversing chamber 230 so that normally the main supply stream does not enter output passage 234, unless, of course, it is deflected downwardly.

A signal input pulse train is supplied to passage 238 having a control jet 240 opening into receiving chamber 230 generally transverse to the main supply stream and offset therefrom in a direction opposite to that of output port 236. So far described, the device acts as a simple pneumatic amplifier. If a signal pulse train is applied to passage 238 the main supply stream is deflected down into output receiver port 236 for as long as each signal or control pulse exists.

A gate pulse transmission line 242 is supplied having a control jet 244 opening into receiving chamber 230 generally transverse to the main supply stream and closely aligned with control jet 240 on the opposite side of the receiving chamber. When a gate pulse is supplied to line 242, its momentum and direction are such that it prevents input pulses from deflecting the main supply stream for as long as the gate pulse exists. The gating or blocking of one pneumatic pulse by another is thus achieved.

Figure 13:
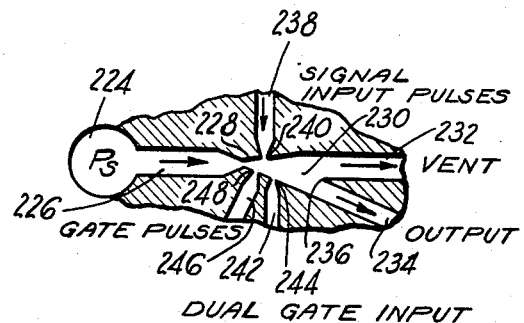
FIGURE 13 is a schematic drawing of a gate valve for selectively blocking a pulse signal in response to two (or more than one) blocking signal.

The basic approach illustrated in FIGURE 12 can be used in a gate with multiple gate signal inputs as shown in FIGURE 13. In this configuration a second gate signal transmission line 246 is added having a control jet 248 generally opposed to the signal input control jet 240. Gate pulses supplied by lines 242 or 246 or both will serve to block an output signal in response to a signal input in line 238.

*Pulse shaper*

The shaping or reshaping of pulses is required whenever an existing pulse form is not proper for an intended use. Thus when either a generated pulse does not have optimum shape because of the characteristic of the pulse generator or when a pulse shape has been distorted because of attenuation over a length of transmission line, it is desired that the pulse be reshaped to be of uniform amplitude and duration. In the present invention logic is transmitted by means of pulse frequency whereby other pulse characteristics such as amplitude and duration are to be held uniform so as not to introduce errors when pulse averaging is utilized such as for example in the digital to analog conversion of the error computer of FIGURE 8.

In FIGURE 14 there is shown a pulse shaper for utilizing an existing signal pulse to trigger the generation of a new output pulse of determined amplitude and duration but having the same frequency as the triggering pulse. The pulse shaper includes a high pressure supply chamber 250, $P_s$, connect by transmission line 252 to main supply jet 254. The high pressure supply stream ejected from jet 254 traverses receiving chamber 256 and normally flow out vent passage 258 to the atmosphere or the like. A triggering pulse which is a distorted signal pulse is supplied by passage 260 having a control jet 262 ejecting into receiving chamber 256 generally transverse to the main supply stream. Output passage 264 is arranged generally obliquely to vent passage 258 and has a receiving port 266 opening into receiving chamber 256 slightly offset from the main supply stream in a direction opposite that of control jet 262. By design, a small depression or volume 268 is formed in the sidewall of output passage 264 downstream of receiving port 266. A triggering pulse supplied by passage 260 is ejected by control jet 262 and causes an upward deflection of the main supply stream from vent passage 258 to output passage 264. As the main supply stream flows out output passage 264 its rapid velocity aspirates fluid from the volume or region provided by depression 268 causing a low pressure region which holds the main supply stream in its deflected condition even after the triggering pulse has stopped. Thus once deflected, the supply stream due to passage design has the capability of attaching itself to the wall of output passage 264 somewhat analogous to an electrical push-pull switch having a holding coil whereby when once actuated holds in its actuated state until a deactivating signal is supplied. It has been found that the ability of the main stream to attach itself to a wall in a deflected condition requires generally intermediate main stream velocities. If velocity is either excessive or too low, a sufficient degree of turbulence does not exist required to aspirate fluid in region 268.

The reset signal for restoring the main supply stream from its deflected state back to vent passage 258 is supplied by a feedback circuit comprised of passage 270 opening into output passage 264 at a spaced distance downstream of region 268. Passage 270 contains a restriction 272 and exhausts into chamber 274. A movable piston 276, which may equivalently be an adjustable diaphragm or bellows, forms one wall of chamber 274 to provide a means for adjusting the chamber volume. Feedback passage 278 having a restriction 280 connects chamber 274 with feedback control jet 282 which ejects into receiving chamber 256 generally transverse to the main supply stream.

The pulse generation and shaping operation proceeds as follows. An acceptable trigger pulse is received in passage 260, is ejected from control jet 262 and deflects the main stream flow into output passage 264. A triggering pulse is acceptable if the magnitude is sufficient or large enough to initiate main stream deflection, the detailed form of trigger pulse is not important and generally is anticipated to be in a considerably distorted or degenerated condition. Once deflected the main stream attaches itself to the output passage wall by means of the aspirating effect on region 268. Part of the main stream flow is diverted through passage 270 into the feedback path comprised of restrictions 272 and 280 and the volume of chamber 274. A time delay in the feedback path is induced by the time required to fill the volume of chamber 274 and build the pressure in the feedback line to a sufficiently high value whereby when ejected by feedback control jet 282 it restores or resets the deflected main stream to its original flow path out vent 258, thus stopping the flow out output passage 264. The output pulse thus produced, started when the trigger pulse was received and lasted until the delayed feedback signal reset the flow. The output pulse length is proportional to the feedback delay, which may be varied by adjustment of the volume in chamber 274 by means of piston 278.

Referring back to the surge system of FIGURE 11, as a surge separation signal is generated as stall is approached, this separation signal is transmitted to pulse shaper 218 to provide a trigger pulse input. Pulse shaper 218 supplies an amplified output pulse train to line 220 wherein the pulses have uniform amplitude and duration, but have the same frequency as the separation signal input pulse. The pulse shaper pulse output is then fed to gate valve 222 to provide a blocking gate signal input to reduce the speed command signal and thus reduce engine speed. A fully integrated system showing the specific interconnections is illustrated in FIGURE 15 and will be later described.

*System*

The overall control system schematic is shown in FIGURE 15 and illustrates an integrated pulse control system utilizing the components heretofore described to perform the functions discussed.

A gas turbine engine generally indicated by numeral 360 consists of an air intake section 362; compressor 364; flame tube combustors 366 receiving air from compressor 364 and fuel from manifold 368 through nozzles 370; a turbine 372 drivingly connected to compressor 364 by shaft 374; and a tailpipe section 376.

Fuel is supplied to manifold 368 from a fuel subsystem 28 corresponding to that shown in FIGURE 9 through metered fuel passage 150. The controlling signal supplied to fuel subsystem 28 is obtained from error and converter device 24 (shown in detail in FIGURE 8), which in turn receives inputs in transmission lines 138 and 140.

As previously stated the speed control loop is the basic control. Speed command pulse signal is provided by a variable frequency tuning fork oscillator 400 (see FIGURE 7) having a pulse frequency established by tuning slug 402 which is adjustable by throttle lever 404. The pulse train in output line 406 therefore has a frequency representing speed demand. Depending on the length of line 406 and the resulting pulse attenuation, one or more pulse shaper 408, corresponding to that shown in FIGURE 14, is arranged in the line to restore pulse shape and strength while maintaining speed command frequency. Line 406 terminates at gate valve 410 (FIGURES 12 and 13) which acts as a simple amplifier when no blocking or gating signals are supplied thus permitting the passage of the speed command signal to passage 138 and provide one control input to error computer 24.

An actual angine speed pulse signal is produced by tachometer 412 (FIGURE 5) which is driven in proportion to engine speed by connection 414 to provide a pulse train in passage 416 proportional to engine speed. The actual speed pulse train in passage 416 is fed to pulse shaper 418 to establish uniform pulse shape and is then transmitted through passage 420 to gate valve 422. When no blocking signal is applied to gate valve 422 the actual speed pulse train is amplified and transmitted to passage 140 as a second input to error computer 24 opposing the speed demand signal in passage 138. When actual engine speed equals that requested by positioning throttle 404 the pulse frequencies in passages 138 and 140 will be balanced and no error signal is produced thus maintaining fuel delivery at its existing rate. If throttle 404 is adjusted, however, to call for either an increase or decrease in engine speed, the frequency of the speed command pulse train will be changed causing an unbalance in speed demand and actual speed pulse frequencies thus inducing an error. The error operates to position lever 202 of the fuel subsystem calling for a corrective change in fuel delivery which in turn induces a speed change in the engine. The engine speed change in turn alters the pulse frequency output of tachometer 412 bringing the actual speed frequency signal back into balance with the demand signal.

In event speed change is so rapid so as to approach closely a compressor stall condition, the impending stall sensing system becomes operative to automatically reduce the speed command signal and avoid stall. The surge system more fully described in connection with FIGURES 10 and 11 includes a fixed frequency pneumatic oscillator 424 to supply an initiation pulse to passage 426 which is applied to the leading edge of a compressor stator blade 210. More than one stall sensing system may be used if desired to cover more of the compressor geometry. If stall is imminent, separation of air flow over the blade occurs producing a separation indicating pulse in passage 428. The separation pulse is fed to pulse shaper providing a uniform pulse shape output in passage 432 corresponding in frequency to that of the oscillator 424 during separation. The stall separation signal in passage 432 is in turn supplied to gate valve 410 as a blocking or gating signal and is operative to reduce the speed command pulse frequency in passage 138 thus calling for a reduction in engine speed which in turn avoids stall. The degree of reduction in engine speed called for is adjusted by changes in the volume chamber in the pulse shaper 408. A larger volume stretches the pulse thus blocking gate 410 for a longer period of time. When stall is not imminent, no separation signal is produced and speed command pulses are not gated by the stall system.

It will be understood that various portions of the invention described herein may be utilized separately of other components, or may be combined with other and different components without departing from the teachings contained herein.

We claim:
1. A compressor stall sensor comprising: a selected compressor blade located in a stream of compressor air flow; said blade having a generally airfoil shape along a chordal section defining a leading edge extending foremost into said air flow stream, a trailing edge disposed hindmost in said air flow stream, a convex surface extending from said leading to said trailing edge inducing low pressure air stream flow adjacent said convex surface, and a concave surface extending from said leading to said trailing edge and spaced from said convex surface; first and second openings formed in said convex surface of said compressor blade; said first opening being spaced toward said leading edge along a blade chordal section from said second opening; first passage means formed in said compressor blade communicating with said first opening; pulse generator means operative to generate a periodic pressure pulse; said pulse generator connected to said first passage to transmit periodic pulses through said first passage and out said first opening into said air stream operative to induce a transitory air stream separation from said convex surface when stall is imminent to thereby induce a pressure increase adjacent said convex surface and along a chordal length thereof; second passage means formed in said compressor blade communicating with said second opening operative to receive an output pressure signal indicative of impending stall.

2. A compressor stall sensor comprising: a selected compressor blade located in a stream of compressor air flow; said blade having a generally airfoil shape along a chordal section defining a leading edge extending foremost into said air flow stream, a trailing edge disposed hindmost in said air flow stream, a convex surface extending from said leading to said trailing edge inducing low pressure air stream flow adjacent said convex surface, and a concave surface extending from said leading to said trailing edge and spaced from said convex surface; first and second openings formed in said convex surface of said compressor blade; said first opening being spaced toward said leading edge along a blade chordal section from said second opening; first passage means formed in said compressor blade communicating with said first opening; pressure supply means connected to said first passage to supply an air pressure greater than the air pressure in said air stream adjacent said convex surface through said first passage and out said first opening to induce a localized air stream separation from said convex surface when stall is imminent; second passage means formed in said compressor blade communicating with said second opening operative to receive an output pressure increase indicative of impending stall.

3. A compressor stall sensor comprising: a selected compressor blade located in a stream of compressor air flow; said blade having a generally airfoil shape along a chordal section defining a leading edge extending foremost into said air flow stream, a trailing edge disposed hindmost in said air flow stream, and a convex surface extending from said leading to said trailing edge inducing low pressure air stream flow adjacent said convex surface; first and second openings formed in said convex surface of said compressor blade; said first opening being spaced toward said leading edge along a blade chordal section from said second opening; first passage means formed in said compressor blade communicating with said first opening; pressure supply means connected to said first passage to supply an air pressure greater than the air pressure adjacent said convex surface through said first opening to induce a localized air stream separation from said convex surface when stall is imminent; second passage means formed in said compressor blade communicating with said second opening operative to receive an output pressure increase indicative of impending stall.

4. A device for sensing impending stall of an airfoil in a moving air stream comprising: an airfoil member having a generally convex surface disposed in a moving air stream; first and second openings formed in said convex surface; said first opening being spaced forwardly in said air stream with respect to said second opening; first passage means communicating with said first opening; pressure supply means connected to said first passage to supply an air pressure greater than the air pressure adjacent said convex surface through said first opening to induce a localized air stream separation from said convex surface when stall is imminent; second passage means communicating with said second opening operative to receive an output pressure increase indicative of impending stall on said airfoil.

References Cited by the Examiner

UNITED STATES PATENTS

| | | | |
|---|---|---|---|
| 2,519,015 | 8/1950 | Bensen | 70—180 |
| 2,569,974 | 10/1951 | Campbell | 340—27 |
| 2,590,521 | 3/1952 | Dyche | 74—180 |
| 3,164,821 | 1/1965 | Broder et al. | 340—27 |

MARK NEWMAN, *Primary Examiner.*

DONLEY J. STOCKING, *Examiner.*

W. L. FREEH, *Assistant Examiner.*